(12) United States Patent
Dekorsy

(10) Patent No.: US 7,808,922 B2
(45) Date of Patent: Oct. 5, 2010

(54) METHOD OF ROUTING AND RESOURCE ALLOCATION IN A WIRELESS COMMUNICATION SYSTEM

(75) Inventor: Armin Dekorsy, Nuremberg (DE)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 178 days.

(21) Appl. No.: 12/072,370

(22) Filed: Feb. 26, 2008

(65) Prior Publication Data
US 2008/0239989 A1 Oct. 2, 2008

(30) Foreign Application Priority Data
Mar. 8, 2007 (EP) ................... 07250981

(51) Int. Cl.
*H04L 12/26* (2006.01)
(52) U.S. Cl. .................. 370/252; 370/468; 455/450; 709/226
(58) Field of Classification Search .............. None
See application file for complete search history.

(56) References Cited
U.S. PATENT DOCUMENTS

| 6,331,986 | B1 * | 12/2001 | Mitra et al. | ............. | 370/468 |
| 2004/0132405 | A1 * | 7/2004 | Kitazawa et al. | ........... | 455/13.4 |
| 2004/0259558 | A1 * | 12/2004 | Skafidas et al. | ............. | 455/450 |
| 2006/0046658 | A1 | 3/2006 | Cruz et al. | ............... | 455/67.11 |
| 2007/0195048 | A1 * | 8/2007 | Nam et al. | ................... | 345/98 |
| 2008/0095121 | A1 * | 4/2008 | Shattil | ....................... | 370/335 |

FOREIGN PATENT DOCUMENTS
EP 0 952 741 A2 10/1999

OTHER PUBLICATIONS

PCT International Search Report PCT/US2008/002533 dated May 30, 2008.
Written Opinion.
Johansson M. et al., "Scheduling, routing and power allocation for fairness in wireless networks" *Vehicular Technology Conference 2004*, VTC 2004-Spring, 2004 IEEE 59th Milan, Italy, May 17-19, 2004, Piscataway, NJ, USA, IEEE, US, vol. 3, (May 17, 2004), pp. 1355-1360, XP010766.

* cited by examiner

*Primary Examiner*—Seema S Rao
*Assistant Examiner*—Khoa Huynh
(74) *Attorney, Agent, or Firm*—Williams, Morgan & Amerson

(57) ABSTRACT

The present invention provides a method for route and resource allocation. One embodiment of the method includes determining at least one network variable associated with a network that includes a plurality of nodes connected by a plurality of links. The network variable(s) are determined based on a plurality of basic loads associated with the plurality of links and a plurality of data rates associated with the plurality of links. The method also includes determining at least one communication variable based on the determined network variable(s) and allocating at least one resource for communication over the network based on the determined network variable(s) and the determined communication variable(s).

8 Claims, 3 Drawing Sheets

METHOD OF ROUTING AND RESOURCE ALLOCATION IN A WIRELESS COMMUNICATION SYSTEM

BACKGROUND OF THE INVENTION

1. Field of the Invention

This invention relates generally to communication systems, and, more particularly, to wireless communication systems.

2. Description of the Related Art

Wireless communication systems include base stations that provide wireless connectivity to associated geographic areas, or cells. Mobile units in a particular cell may access the wireless communication system by establishing a wireless communication link with the base station that serves the cell containing the mobile unit. Among other factors, the size of a cell associated with a base station is limited by the transmission power of mobile units, the sensitivity of the base station to the signals transmitted by the mobile unit, and the transmission power of the base station. For example, the strength of signals received by the mobile unit from the base station is approximately inversely proportional to the square of the distance between the mobile unit and the base station. Accordingly, the radius of the cell served by the base station is approximately proportional to the square root of the transmission power. Furthermore, the maximum data rate that may be used to transmit information from the base station to the mobile unit is inversely related to the range of the base station, i.e., the maximum data transmission rate decreases as the distance between the base station and the mobile unit increases.

Wide-area wireless broadband access is poised to become ubiquitous with the advent of technologies such as WIFI (802.11), WIMAX (802.16) and high data rate cellular systems (UMTS-HSDPA, UMTS-LTE). However, a large number of base stations may be needed to provide coverage to a given area, at least in part because of the inverse relation between the data rate and the base station range, as well as the limitations on range imposed by power discussed above. Backhaul links are used to carry information from each of these base stations back to the network. For example, a backhaul link may be used to connect a base station to a core network, which may be connected to a public network such as an Internet. The backhaul links may be wired and/or wireless.

Although every base station must be connected to the network via a backhaul link, providing a dedicated backhaul link directly from each base station back to a network node may be inefficient. Instead, the wireless communication system may implement mesh or multi-hop networking to improve efficiency. For example, in a distributed wireless communication system that uses base station routers, wireless backhaul links may be used to provide the necessary backhaul solutions. However, the base station router may be relatively far from an access node of the network, but may be relatively close to one or more other base station routers in the network. The base station router may then form a backhaul link to the network via intermediate links to one or more other base station routers, e.g., the wireless backhaul link from the base station router to the network may be formed of a mesh of other base station routers and wireless communication links between these base station routers. Routing in formation from the source to the destination over multiple wireless links of a mesh network has many potential advantages over traditional single-hop networking, such as coverage enhancement, user cooperation diversity, and increased capacity. Mesh networking has therefore been intensively studied in the context of wireless ad-hoc networks.

From a mathematical perspective, the calculation of routes and resources that are allocated in the mesh network can generally be described as an optimization problem that is conventionally referred to as a Simultaneous Routing and Resource Allocation (SRRA) problem. Solutions to the SRRA problem for a particular mesh network should indicate values of one or more network flow variables and communication variables that will maximize a network utility function while meeting given quality of service (QoS) and network constraints. Examples of network variables include data rates per link, injected information per source, and buffer status per node. Examples of communication variables include power per link and codes/spatial/frequency/time resources per link. However, the SRRA problem for a realistic communication network is non-convex and is therefore only local optima can be computed in a reasonable amount of time. The local optima of the non-convex system may correspond to solutions that represent local peaks in the network utility function, but the local optima of a non-convex system are not guaranteed to be global optima of the non-convex system. Consequently, there is no guarantee that the local optima represent a solution that maximizes the network utility function.

At least in part because of the difficulties in solving non-convex problems described above, conventional approaches to routing and resource allocation in mesh networks have attempted to reduce the non-convex problem to a convex problem by adopting various assumptions. For example, the routing and resource allocation problem can be reduced to a convex problem by assuming that each transmission is perfectly orthogonal to every other transmission so that there is no crosstalk interference between transmissions. However, transmissions in realistic wireless communication systems are never perfectly orthogonal and there is always some crosstalk interference between the transmissions. In some cases, the interference, which may be indicated by a signal-to-interference-plus-noise ratio (SINR), can become quite large, which may invalidate the assumption of perfectly orthogonal transmissions and lead to erroneous or irrelevant solutions to the routing and resource allocation problem.

Johansson, et al. (M. Johansson and L. Xiao and S. Boyd, "*Simultaneous Routing and Resource Allocation in CDMA Wireless Data Networks*", International Conference on Communication (ICC), Vol. 1 pp. 51-55, Anchorage, Ak., May 2003) discusses one example of a conventional technique for reducing the non-convex routing and resource allocation problem to a convex problem. In the technique described by Johansson, project coordination and the assumption of perfect signal orthogonality are applied to convert the non-convex problem into an equivalent convex one. An approximate capacity formula that is valid for high signal-to-interference plus noise ratios (SINRs) is adopted and the SRRA problem is then solved by standard network flow and power control algorithms that are valid for convex problems. A heuristic link-removal procedure is used to remove links in the network that are not able to meet the assumption of high signal-to-noise ratios and the SRRA problem calculation is repeated with the reduced network topology till all links have high SINR values.

Although the technique described by Johansson converges to a feasible solution, the solution always includes non-zero capacities and power values for all edges in the mesh. Consequently, the solution requires that data be transmitted on all links that are available in the network. Solutions that require transmission on all available links are not optimal and are typically not acceptable in practice. Furthermore, the approximations adopted by Johansson are only valid for high SINRs and this assumption is frequently not met in realistic systems. For example, in CDMA systems, the high SINR assumption can only be met in most cases by applying highly complex interference cancellation techniques. The iterative procedure for removing the links that have low SINR is computational very intensive. For example, a new solution to the convex SRRA problem must be computed after each removal step to find the optimum routing, scheduling and power setting for the reduced network topology. Moreover, the algorithm described by Johansson is heuristic. Heuristic solutions provide no measure of the quality of the solution, which means that the solution provided by the technique described by Johansson is a feasible solution but there is no guarantee that it is an optimal solution.

Fattahi and Pagannini (*New Economic Perspectives for Resource Allocation in Wireless Networks*", American Control Conference, pp. 3960-3965, Portland, Oreg., USA, June 2005) apply economic approaches of game theory and bargaining theory to resource allocation in CDMA networks. By applying bargaining theory the SRRA problem can be solved with less complexity even though the problem remains non-convex. Fattahi and Pagannini suggest an iterative algorithm that separates network routing and power allocation and applies bargaining methods to the problem of power allocation. The bargaining methods are implemented in a centralized fashion leading to central power control. The technique described by Fattahi and Pagannini is heuristic and therefore provides no guarantee that the solution is optimal. Furthermore, these approaches are not compatible with standard algorithms and would require completely new hardware and software solutions to implement in current wireless communication systems. Thus, the standard and well-understood power control algorithms implemented in UMTS or CDMA2000 products would have to be abandoned to implement the procedures described by Fattahi and Pagannini.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for route and resource allocation. The method includes determining at least one network variable associated with a network that includes a plurality of nodes connected by a plurality of links. The network variable(s) are determined based on a plurality of basic loads associated with the plurality of links and a plurality of data rates associated with the plurality of links. The method also includes determining at least one communication variable based on the determined network variable(s) and allocating at least one resource for communication over the network based on the determined network variable(s) and the determined communication variable(s).

BRIEF DESCRIPTION OF THE DRAWINGS

The invention may be understood by reference to the following description taken in conjunction with the accompanying drawings, in which like reference numerals identify like elements, and in which.

Figure 1:
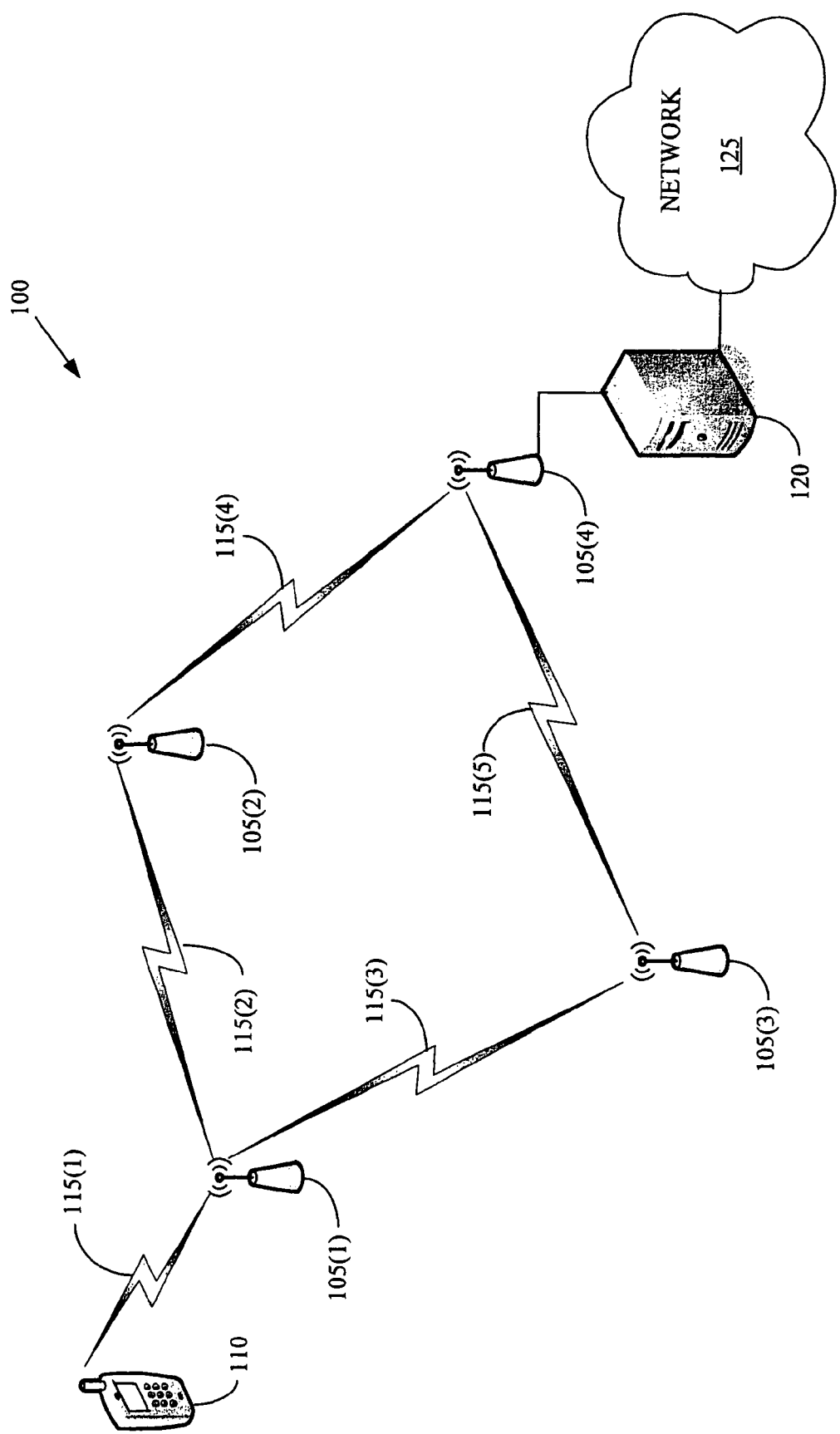
FIG. 1 conceptually illustrates one embodiment of a wireless telecommunication system.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one embodiment of a wireless telecommunication system 100. In the illustrated embodiment, access points for the wireless telecommunication system 100 include a distributed network of base station routers 105(1-4). Hereinafter, in the interest of clarity, the base station routers 105(1-4) will be referred to collectively by the index 105 unless the description is referring to a specific base station router 105 or subset of the base station routers 105, such as the base station router 105(1). Base station routers 105 are functionally and structurally different than base stations that are used in hierarchical networks. For example, each base station router 105 may combine base station (or node B), radio network controller (RNC), and/or packet data serving node (PDSN) functions in a single entity that manages radio links between one or more mobile units and an outside network, such as the Internet. Compared to hierarchical networks, distributed architectures have the potential to reduce the cost and/or complexity of deploying the network, as well as the cost and/or complexity of adding additional wireless access points, e.g. base station routers 105, to expand the coverage of an existing network. Distributed networks may also reduce (relative to hierarchical networks) the delays experienced by users because packet queuing delays at the RNC and PDSN of hierarchical networks may be reduced or removed.

The base station routers 105 provide wireless connectivity to mobile units associated with an associated geographic region, or cell, such as the mobile unit 110 shown in FIG. 1, via wireless communication links 115. Each of the base station routers 105 may be capable of initiating, establishing, maintaining, transmitting, receiving, terminating, or performing any other desired action related to a call session with one or more mobile units. One or more of the base station routers 105 may also be connected (via a wired and/or wireless connection) to a server or gateway device 120 that provides access to a network 125. In various alternative embodiments, the network 125 may be a wired and/or wireless network that operates according to any communication protocol, such as an Internet protocol. However, the particular type of the network 125 is not material to the present invention.

The base station routers 105 may be configured to communicate with other base station routers 105 over wireless communication links 115. In one embodiment, the wireless communication link 115(1) between the mobile unit 110 and the base station router 105(1) may be formed in the same frequency band as the wireless communication links 115(2-5) between the base station routers 105. This type of system is conventionally referred to as an "in-band" system. Alternatively, the wireless communication links 115(2-5) between the base station routers 105 may be allocated a frequency band that is separate and distinct from the frequency band used by the wireless communication link 115(1) between the mobile unit 110 and the base station router 105(1). Techniques for initiating, establishing, maintaining, operating, and/or terminating the wireless communication links 115(2-5) between the base station routers 105 are known in the art and in the interest of clarity only those aspects of initiating, establishing, maintaining, operating, and/or terminating the wireless communication links 115(2-5) that are relevant to the present invention will be discussed herein.

In the illustrated embodiment, the wireless communication links 115(2-5) may be used to perform wireless backhaul between the base station router 105(1) and the network 125. Although the present invention will be described in the context of providing wireless backhaul within a distributed wireless telecommunication system 100 comprising a plurality of base station routers 105, persons of ordinary skill in the art should appreciate that the present invention is not limited to distributed wireless telecommunication systems 100 in which the access points are base station routers 105. In alternative embodiments, the wireless telecommunication system 100 may include any desirable number and/or type of access point. Furthermore, the techniques described herein may be applied in any meshed wireless data network that supports multi-hop routing and may be used for routing and/or resource allocation associated with any type of communication between the base station routers 105.

The wireless communication network 100 implements joint routing and resource allocation. The techniques described herein allow for multicommodity transmission where more than one source-destination pair of nodes, such as pairs of base station routers 105, transmits data through the network 100. Examples of commodity include, but are not limited to, aggregate traffic in case of wireless backhaul networking or user/sensor specific traffic in ad-hoc/sensor networks. Generally, the algorithm calculates the routes per source-destination flow and the resources (powers, data rates etc.) allocated to links in order to carry the flows. From a mathematical perspective, the calculation of routes and resources can be described as an optimization problem that is conventionally referred to as a Simultaneous Routing and Resource Allocation (SRRA) problem.

The joint routing and resource allocation problem, as well as the solution to the problem, may be characterized by network flow variables and network communication variables.

As used herein in accordance with common usage in the art, the term "network flow variable" will be understood to refer to variables that characterize the flow of information through the network 100, such as data transmission rates per link (such as the wireless communication links 115), injected information per source, buffer status per node, and the like. As used herein in accordance with common usage in the art, the term "network communication variable" will be understood to refer to variables that characterize the network communication resources available for allocation. Exemplary network communication variables include transmission power per link, code resources for a link, spatial resources per link, frequency resources per link, time resources per link, and the like.

One embodiment of a technique for solving the joint routing and resource allocation problem includes converting the non-convex problem of concurrently determining the network flow variables and network communication variables to a convex problem by adding an artificial basic load to each of the wireless communication links 115. The convex problem may then be solved to determine the network flow variables and a first estimate of the network communication variables. The network flow variable solution provided by solving the convex problem including the basic loads has been shown to be an optimal solution to the joint routing and resource allocation problem. However, the first estimate of the network communication variables may not be optimal. The network communication variables may then be determined by applying a power control algorithm, such as conventional power control algorithms, using the network flow variables that were determined by solving the convex routing and resource allocation problem. Resources may then be allocated to the base station routers 105 and/or the wireless communication links 115 based on the network flow variables generated by the convex problem solution and the network communication variables generated by the power control algorithm.

Figure 2:
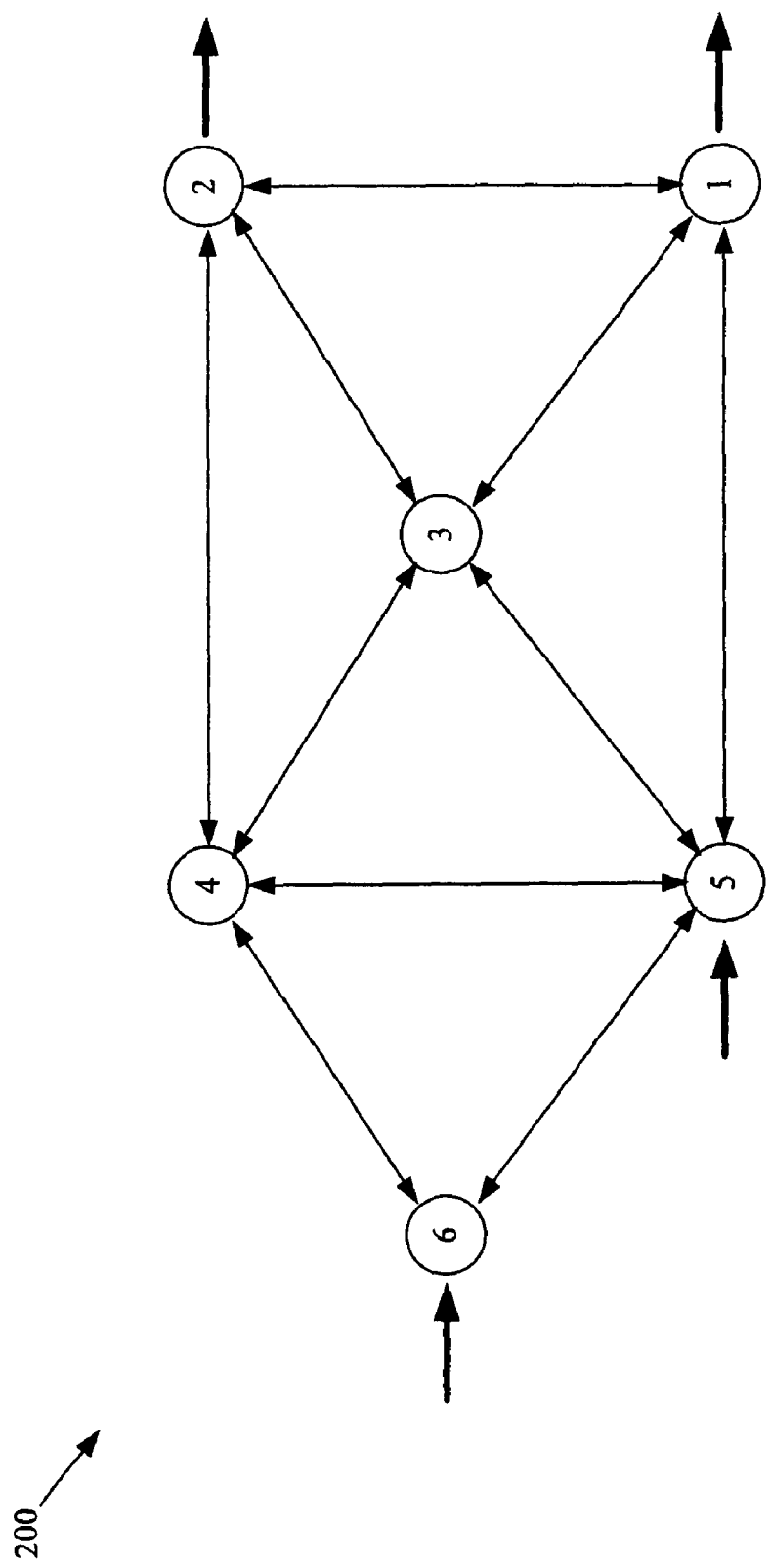
FIG. 2 conceptually illustrates one exemplary embodiment of a wireless communication system that includes a plurality of nodes.

FIG. 2 conceptually illustrates one exemplary embodiment of a wireless communication system 200 that includes a plurality of nodes 1-6. In various alternative embodiments, the nodes 1-6 may be base stations, base station routers, access points, access networks, and the like. The nodes 1-6 are interconnected by a number of wireless communication links indicated by double-headed arrows. At a given time, the wireless communication links may support communications having a given quality of service and/or maximum data transmission rate. For example, channel conditions on the wireless communication links may determine a maximum data transmission rate for information transmitted over the wireless communication link. The channel conditions may also limit the quality of service that may be provided over the wireless communication link. In the illustrated embodiment, the wireless communication system 200 supports a first wireless backhaul from the node 6 to the nodes 1 and a second wireless backhaul from the node 5 to the node 2. The routes through the nodes 1-6 for the two wireless backhauls and the resources that may be allocated for transmitting information over these routes may be determined by converting the non-convex joint route and resource allocation problem to a convex problem by incorporating basic loads on the wireless communication links.

Figure 3:
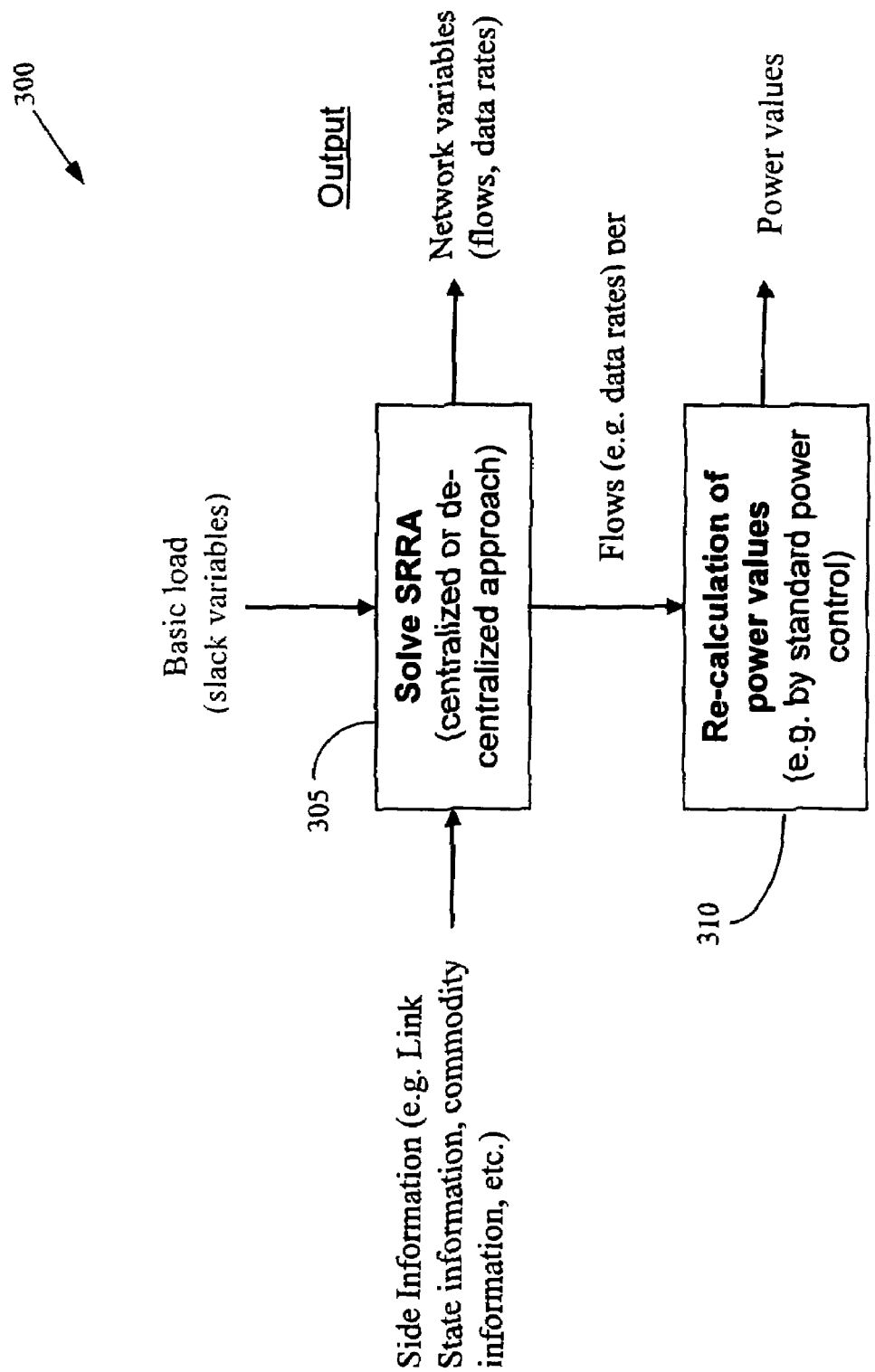
FIG. 3 conceptually illustrates one exemplary embodiment of a method for solving the joint route and resource allocation problem by conversion to a convex problem.

FIG. 3 conceptually illustrates one exemplary embodiment of a method 300 for solving the joint route and resource allocation problem by conversion to a convex problem. In the illustrated embodiment, a basic load per link is introduced. This basic load artificially shifts the signal-to-interference-plus-noise ratio (SINR) to higher regions. The basic load variables may be selected so that this shift has no impact on the calculated network variables when solving the SRRA problem. The basic load may impact the power setting for the network resulting in higher power values than required. The SRRA problem is first solved (at 305) with the basic load in order to obtain solutions for the network variables, e.g. routes and data rates.

The following equation mathematically formulates the SRRA problem where c represents network flow variables and p represents network communication variables:

max U(c) or max U(p) s.t.

$c \in C_c$ $p \in C_p$ $t_l = f(c), l = 1 \ldots L$ $t_l + \phi_l(\epsilon) \leq \phi_l(SINR), l = 1 \ldots L$ (coupling constraint)

where
L: number of links in the network
U: utility function of the network (to be concave in (c,p))
$C_p := \{p | p \text{ fulfills all constraints } c_i(p)\}$
$C_c := \{c | c \text{ fulfill all constraints } c_i(c)\}$
Both sets $C_p$ and $C_c$ are convex sets
$t_l$: data rate to be transmitted on link l
f: any convex function in c, e.g.

$$t_l = \sum_d c_l(d)$$

d=1 ... D, with D as number of commodities
$\phi$: non-convex function expressing the maximum data rate that can be transmitted on the link if the link suffers any interference. A widely used function, but not restricted to it, is the channel capacity
$\phi(SINR) = \log_2(1+SINR)$ with $SINR = SINR(p)$ as signal-to-interference plus noise ratio.

In the mathematical formulation shown above, the basic load $\phi_l(\epsilon)$ has been introduced in the coupling constraint as a slack variable per link l. In the illustrated embodiment, the parameter $\epsilon$ represents a signal-to-interference-plus-noise ratio (SINR) that generates a shift towards higher SINR ratios. Techniques for solving (at 305) the convex SRRA problem defined above are known in the art and in the interest of clarity will not be discussed further herein. Once the convex route and resource allocation problem has been solved for the network flow variables using the basic load, the network communication variables are determined (at 310) using the previously calculated network flow variables. No re-calculation of the SRRA problem is required to determine (at 310) the network communication variables.

The techniques for joint route and resource allocation described herein have a number of advantages over conventional practice. By appropriately choosing the slack variables, the optimal network flow variables for the original non-convex SRRA problem may be generated by solving a much simpler convex problem. Using the optimal network flow variables for an a posteriori re-calculation of the power values may generate the optimal power setting, e.g., the network communication variables may also represent an optimal solution to the original non-convex SRRA problem. Thus, the techniques described herein may generate the optimal SRRA solution. The method is suitable for application in any wireless network, regardless of the levels of link interference, which makes this technique particularly suitable for application in wireless networks that implement CDMA technology.

Furthermore, the solutions obtained using this technique do not necessarily require use of all available communication links. Only those links that are necessary to generate the optimal solution are used. Thus, network utilization may be increased, potentially leading to higher network performance in terms of higher capacity, lower delays and/or reduced power consumption. Furthermore, this approach may be implemented in distributed wireless communication systems, such as those that utilize base station routers, which combine the functionality of conventional the functionality of base stations and base station controllers from conventional hierarchical networks.

The complexity of the solution techniques described herein is significantly lower than conventional techniques, at least in part because the joint route and resource allocation problem is solved a single time and does not need to be iterated. Furthermore, the techniques described herein are not heuristic and thus it is possible to determine that the solutions are optimal, in addition to being feasible. The techniques described herein may also leverage standard algorithms, such as network flow algorithms and power control algorithms, which may reduce the complexity of the techniques relative to conventional practice. Thus, these techniques are compliant with current network technologies and can be integrated into existing networks such as WIMAX. The techniques described herein may be applied to wireless backhaul networks, sensor networks, and/or ad-hoc networks and may be implemented in a centralized or decentralized manner. Decentralized implementation may be particularly useful in the context of flat all-IP networks Since we can use state-of the art algorithms the complexity of the proposed method is low. In particular, the techniques described herein may improve the performance of base station routers that are used in wireless meshed networks.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed:

1. A method, comprising:
   determining, using a computing device implemented in a distributed network comprising a plurality of base station routers connected by a plurality of wireless links, network flow variables associated with the distributed network, wherein the network flow variables represent the flow of information through the distributed network, and wherein the network flow variables being determined based on a plurality of basic loads associated with the plurality of wireless links and a plurality of data rates associated with the plurality of wireless links,
   wherein each of the plurality of data rates being determined by a non-convex function of a signal-to-interference-plus-noise-ratio that is generated on each of the plurality of wireless links in accordance with the network flow variables,
   and wherein each of the plurality of basic loads represents an artificial load added to each of the plurality of wireless links to shift the signal-to-interference-plus-noise ratio that is generated on each of the plurality of wireless links to higher regions,
   wherein determining each of the plurality of basic loads comprises determining a slack variable based upon a non-convex function of a parameter representative of a selected signal-to-interference-plus-noise ratio for each of the plurality of wireless links;
   determining, using the computing device, at least one network communication variable based on at least one of the determined network flow variables, wherein the at least one network communication variable represents at least one network communication resource available for allocation;
   and allocating, using the computing device, the at least one network communication resource for communication over the distributed network based on the at least one of the determined network flow variables and the at least one determined network communication variable.

2. The method of claim 1, wherein determining the network flow variables further comprises: determining at least one route including at least one of the plurality of wireless links.

3. The method of claim 2, wherein determining the network flow variables further comprises: determining at least one data rate for transmissions over the at least one of the plurality of wireless links.

4. The method of claim 1, wherein determining the at least one network communication variable further comprises: determining at least one of a transmission power per link, a code per link, a spatial resource per link, a frequency resource per link, and a time resource per link.

5. The method of claim 1, wherein allocating the at least one network communication resource further comprises: allocating at least one route comprising at least one of the plurality of wireless links between a source node and a destination node.

6. The method of claim 5, wherein allocating the at least one network communication resource further comprises: allocating at least one of a transmission power and a transmission data rate for transmission over the at least one of the plurality of wireless links between the source node and the destination node.

7. The method of claim 1, wherein allocating the at least one network communication resource further comprises: allocating the at least one network communication resource to at least one of a wireless backhaul link and a wired backhaul link.

8. The method of claim 1, wherein determining the network flow variables further comprises: wherein the determining of each of the plurality of data rates subject to the constraints that each of the plurality of data rates is less than or equal to a difference between a non-convex function of a measured signal-to-interference-plus-noise ratio for each of the plurality of wireless links and the non-convex function of the parameter representative of the selected signal-to-interference-plus-noise ratio for each of the plurality of wireless links.

* * * * *